(12) United States Patent
Luo

(10) Patent No.: US 10,882,586 B2
(45) Date of Patent: Jan. 5, 2021

(54) TRANSMISSION STRUCTURE FOR BICYCLE

(71) Applicant: Shenzhen Nanbo Automation Equipment CO., LTD., Shenzhen (CN)

(72) Inventor: Liyuan Luo, Shenzhen (CN)

(*) Notice: Subject to any disclaimer, the term of this patent is extended or adjusted under 35 U.S.C. 154(b) by 227 days.

(21) Appl. No.: 16/199,541

(22) Filed: Nov. 26, 2018

(65) Prior Publication Data
US 2020/0130776 A1 Apr. 30, 2020

(30) Foreign Application Priority Data

Oct. 25, 2018 (CN) .......................... 2018 1 1247677
Oct. 25, 2018 (CN) ..................... 2018 2 1741480 U

(51) Int. Cl.
| | | |
|---|---|---|
| *B62M 1/28* | (2013.01) | |
| *B62M 9/02* | (2006.01) | |
| *B62M 21/00* | (2006.01) | |
| *B62M 9/00* | (2006.01) | |

(52) U.S. Cl.
CPC .............. *B62M 1/28* (2013.01); *B62M 9/02* (2013.01); *B62M 21/00* (2013.01); *B62M 2009/002* (2013.01)

(58) Field of Classification Search
CPC . B62M 1/24; B62M 1/28; B62M 9/02; B62M 21/00; B62M 2009/002
See application file for complete search history.

(56) References Cited

U.S. PATENT DOCUMENTS

| | | | | |
|---|---|---|---|---|
| 651,244 | A * | 6/1900 | Forbes ..................... | B62M 1/18 280/223 |
| 3,891,235 | A * | 6/1975 | Shelly ...................... | B62M 1/28 280/252 |
| 3,939,719 | A * | 2/1976 | Stovall ..................... | B62M 1/28 74/128 |
| 4,169,609 | A * | 10/1979 | Zampedro ............... | B62M 1/28 280/241 |
| 5,496,051 | A * | 3/1996 | Farmos .................... | B62M 1/24 280/251 |
| 6,090,002 | A * | 7/2000 | Farmos .................... | B62M 1/28 280/252 |
| 6,113,510 | A * | 9/2000 | Farmos .................... | B62M 1/28 280/252 |
| 6,123,635 | A * | 9/2000 | Farmos .................... | B62M 1/28 280/252 |

(Continued)

*Primary Examiner* — Ruth Ilan
*Assistant Examiner* — Michael R Stabley
(74) *Attorney, Agent, or Firm* — Erson IP (Nelson IP)

(57) ABSTRACT

A transmission structure for a bicycle includes two opposite transmission units. Each of the transmission units includes a linear reciprocating pedaling mechanism, a transmission module which is in transmission connection with the linear reciprocating pedaling mechanism, and a resetting module connected with the transmission module. The transmission modules of the two transmission units are connected with a power output mechanism through a unidirectional transmission mechanism. The transmission module includes a first driven wheel and a first transmission gear configured to be coaxial with the first driven wheel. The resetting module includes a connecting piece and an elastic piece. The connecting piece is connected with the first transmission gear. The elastic piece is connected with the connecting piece.

7 Claims, 11 Drawing Sheets

(56) References Cited

U.S. PATENT DOCUMENTS

| | | | | |
|---|---|---|---|---|
| 6,123,636 | A | * | 9/2000 | Farmos .................... B62M 1/28 |
| | | | | 280/252 |
| 6,129,646 | A | * | 10/2000 | Farmos .................... B62M 1/24 |
| | | | | 280/241 |
| 6,155,584 | A | * | 12/2000 | Dallet ..................... B62K 3/005 |
| | | | | 280/233 |
| 6,237,928 | B1 | * | 5/2001 | Islas ........................ B62M 1/24 |
| | | | | 280/252 |
| 6,412,802 | B1 | * | 7/2002 | Kugel ..................... B62M 1/00 |
| | | | | 280/252 |
| 6,723,029 | B2 | * | 4/2004 | Salgado ................... B62M 1/24 |
| | | | | 280/252 |
| 7,559,264 | B2 | * | 7/2009 | Qian ....................... B62M 1/24 |
| | | | | 74/89 |
| 7,679,494 | B2 | | 3/2010 | Fujii et al. |
| 8,215,654 | B1 | * | 7/2012 | Leser ...................... B62M 1/28 |
| | | | | 280/252 |
| 9,028,372 | B2 | * | 5/2015 | Beard .................. A63B 21/157 |
| | | | | 482/57 |
| 10,065,705 | B2 | | 9/2018 | Kuwayama et al. |
| 2003/0020254 | A1 | * | 1/2003 | Weaver, II ............... B62M 1/24 |
| | | | | 280/252 |
| 2003/0173755 | A1 | * | 9/2003 | Lachenmayer .......... B62M 1/28 |
| | | | | 280/252 |
| 2005/0051992 | A1 | * | 3/2005 | Lachenmayer .......... B62M 1/28 |
| | | | | 280/252 |
| 2006/0181050 | A1 | * | 8/2006 | Moreno ................. B62K 3/002 |
| | | | | 280/221 |
| 2009/0088284 | A1 | | 4/2009 | Patterson |

* cited by examiner

TRANSMISSION STRUCTURE FOR BICYCLE

CROSS-REFERENCE TO RELATED APPLICATIONS

This application claims priority to Chinese Patent Application No. 201811247677.X with a filing date of Oct. 25, 2018 and Chinese Patent Application No. 201821741480.7 with a filing date of Oct. 25, 2018. The content of the aforementioned applications, including any intervening amendments thereto, are incorporated herein by reference.

TECHNICAL FIELD

The present disclosure relates to the technical field of pedals resetting of a bicycle, and particularly relates to a transmission structure for a bicycle capable of realizing resetting of pedals in a short process and having the characteristics of saving space, time and labor.

BACKGROUND OF THE PRESENT INVENTION

A bicycle, as a transportation tool which produces forward power by human pedaling, meets human travelling requirements together with other transportation tools such as motor vehicles, but the existing bicycle is driven by a front sprocket wheel and a rear sprocket wheel and a gear connected to the front sprocket wheel and the rear sprocket wheel. The rear sprocket wheel is driven by foot force to obtain the forward power. It is easy to cause over-fatigue pain of leg muscles after long-term pedaling.

SUMMARY OF PRESENT INVENTION

In order to solve the defects in prior art, the present disclosure provides a transmission structure for a bicycle capable of realizing resetting of pedals in a short process and having the characteristics of saving space, time and labor.

A technical solution adopted by realizing the above technical effects in the present disclosure is as follows:

A transmission structure for a bicycle includes two opposite transmission units; each of the transmission units comprises a linear reciprocating pedaling mechanism and a transmission module which is in transmission connection with the linear reciprocating pedaling mechanism; and the transmission modules of the two transmission units are connected with a power output mechanism through a unidirectional transmission mechanism, each of the transmission units further comprises a resetting module connected with the transmission module.

Preferably, the transmission module comprises a first driven wheel and a first transmission gear configured to be coaxial with the first driven wheel; the resetting module comprises a connecting piece and an elastic piece; the connecting piece is connected with the first transmission gear; and the elastic piece is connected with the connecting piece.

Preferably, the transmission module further comprises a second driven wheel and a transmission connection device; and the first driven wheel is connected with the second driven wheel through the transmission connection device.

Preferably, the transmission connection device is provided with an auxiliary wheel rotatably connected therewith.

Preferably, the linear reciprocating pedaling mechanism comprises a linear guide rail which is disposed linearly and a pedal which is in sliding connection with the linear guide rail; the linear guide rail is parallel to one side of the transmission connection device; and the pedal is fixedly connected with the side of the transmission connection device.

Preferably, the connecting piece is a gear engaging plate; the gear engaging plate is rotatably connected through a rotating shaft fixed to a bicycle frame; one end of the gear engaging plate is provided with a transmission tooth which is in transmission connection with the first transmission gear; and the other end of the gear engaging plate is provided with a hanging portion rotatably connected therewith.

Preferably, the other end of the elastic piece of each of the two transmission units is connected with a fixing piece.

Preferably, the fixing piece is an adjustable fixing piece and comprises a fixing seat, a tapered screw, a fixing head, a locking head, two adjusting threaded rods and two sliding pieces; the fixing seat is provided with two adjusting threaded rod holes used to penetrate the two adjusting threaded rods through threads and a screw hole used to penetrate the tapered screw through threads; the two sliding pieces are respectively sleeved on the fixing seat in a sliding way, and are positioned between the corresponding adjusting threaded rod hole and the screw hole; the fixing head is in threaded connection with lower ends of the adjusting threaded rods and is fixedly connected with the other end of the elastic piece; and the locking head is in threaded connection with a lower end of the tapered screw.

Preferably, a process amplification gear set is disposed between the connecting piece and the first transmission gear.

Preferably, the elastic piece is selected from one of a tension spring, a pressure spring, a coil spring, a spring and a torsional spring.

The present disclosure has the beneficial effects: the transmission structure for the bicycle of the present disclosure can realize resetting of the pedals through the resetting module, and can further realize resetting of the pedals in a short process through transmission fit of the elastic piece, the first transmission gear and the connecting piece, thereby saving time and labor.

DETAILED DESCRIPTION OF PREFERRED EMBODIMENTS

To further understand the present disclosure, the present disclosure is further described below in combination with drawings of the description and specific embodiments.

Figure 1:
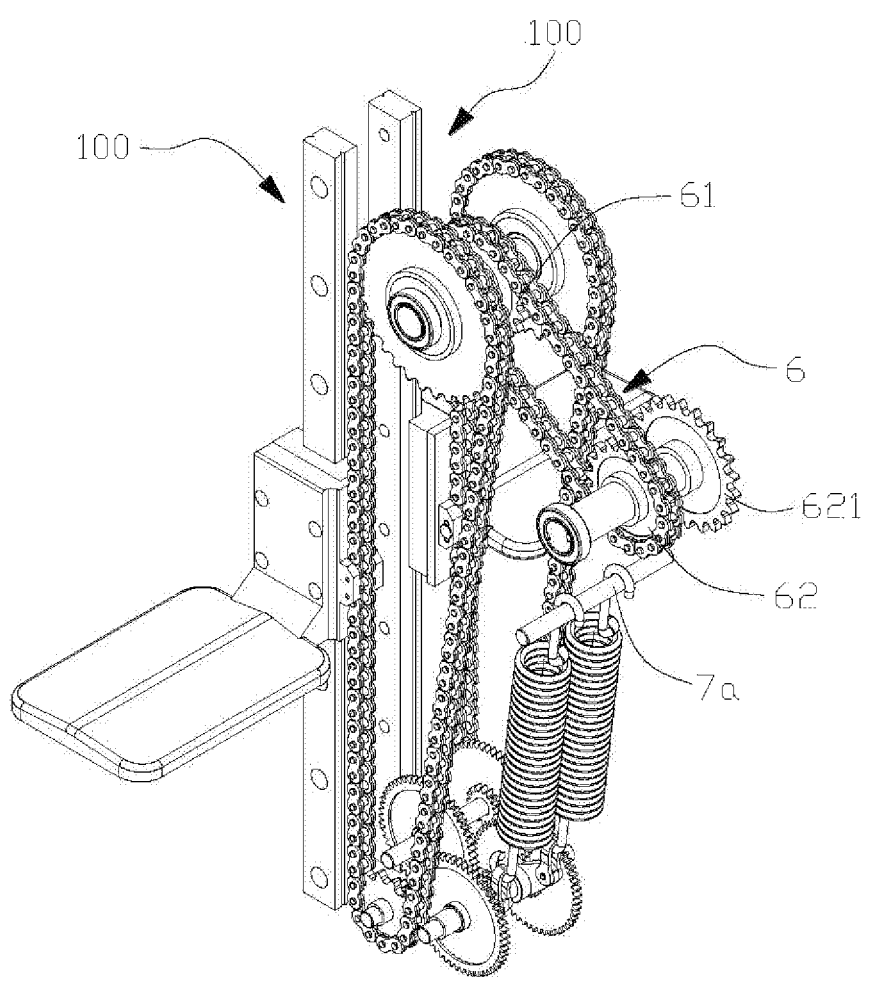
FIG. 1 is a three-dimensional structural diagram of a transmission structure for a bicycle in an embodiment of the present disclosure.
Figure 2:
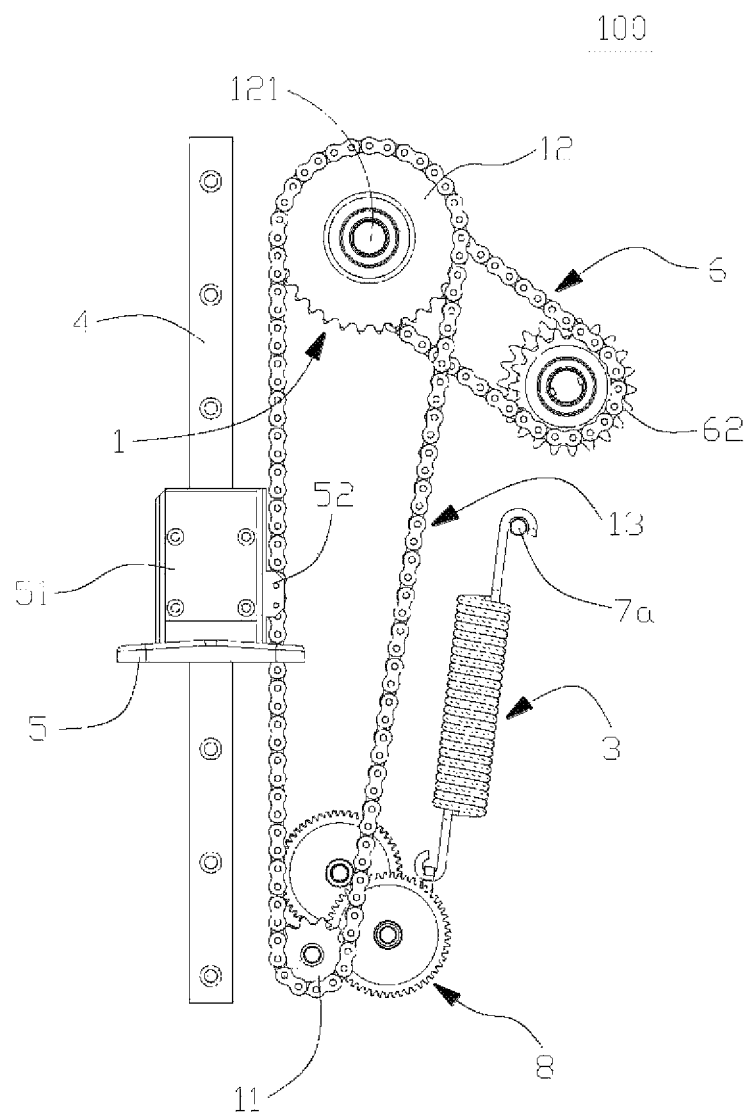
FIG. 2 is a structural diagram of a side surface of a transmission unit in an embodiment of the present disclosure.
Figure 3:
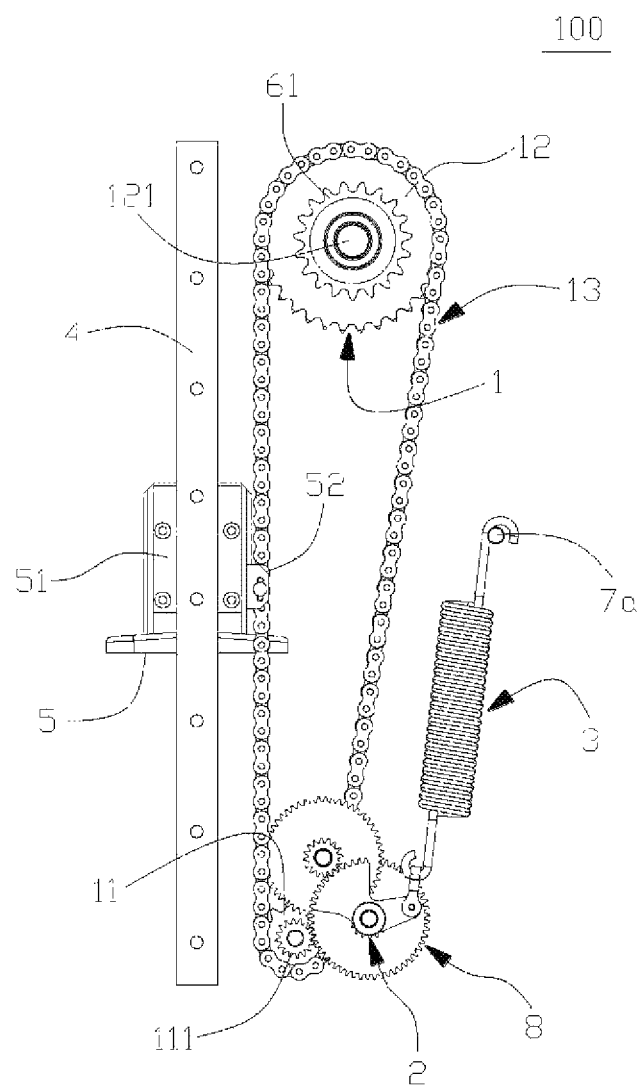
FIG. 3 is a structural diagram of another side surface of a transmission unit in an embodiment of the present disclosure.

FIG. 1 to FIG. 3 show a schematic diagram of a transmission structure for a bicycle in an embodiment of the present disclosure. The transmission structure for the bicycle includes two opposite transmission units 100. Each of the transmission units 100 includes a linear reciprocating pedaling mechanism and a transmission module 1 which is in transmission connection with the linear reciprocating pedaling mechanism. The transmission modules 1 of the two transmission units 100 are connected with a power output mechanism 6 through a unidirectional transmission mechanism. A wheel which is in transmission connection with the power output mechanism 6 obtains riding power through the power output mechanism 6. The transmission unit 100 further includes a resetting module connected with the transmission module 1 of the transmission unit 100. The transmission module 1 includes a first driven wheel 11 and a first transmission gear 111 configured to be coaxial with the first driven wheel 11. The first transmission gear 111 is linked with the first driven wheel 11. The resetting module includes a connecting piece 2 and an elastic piece 3, wherein the connecting piece 2 is in transmission connection with the first transmission gear 111, and the elastic piece 3 is connected with the connecting piece 2.

In some embodiments, the transmission module 1 further includes a second driven wheel 12 and a transmission connection device 13. The first driven wheel 11 is connected with the second driven wheel 12 through the transmission connection device 13. The unidirectional transmission mechanism is fixed to a shaft 121 of the second driven wheel 12. Two corresponding second driven wheels 12 in the two transmission units 100 are synchronously fixed to the shaft 121. The unidirectional transmission mechanism further rotates synchronously only when the second driven wheels 12 rotate towards one fixed direction. The power output mechanism 6 rotates with the second driven wheels 12, and outputs a rotating torque outwards, so that the wheel connected with the power output mechanism 6 obtains the riding rotating force. When the second driven wheels 12 rotate backwards, the unidirectional transmission mechanism does not rotate with the second driven wheels 12. Correspondingly, the power output mechanism 6 further does not rotate with the second driven wheels 12 at this moment. FIG. 1 and FIG. 2 show the power output mechanism 6. FIG. 3 does not show the power output mechanism 6. In the embodiments shown in FIG. 1 to FIG. 3, the power output mechanism 6 of the transmission structure for the bicycle in the present disclosure is in transmission connection in a middle position of the shaft 121, i.e., positioned between the two corresponding second driven wheels 12 in the two transmission units 100. In some embodiments, as shown in FIG. 1 to FIG. 3, the power output mechanism 6 includes a first output wheel 61 fixed to the shaft 121, a second output wheel 62 which is in transmission connection with the wheels of the pedal, and a transmission chain which is in transmission connection with the first output wheel 61 and the second output wheel 62. The second output wheel 62 is coaxially fixed to a power transmission wheel 621. The power transmission wheel 621 and shaft end gear disks of the wheels of the pedal are connected through a chain to realize power output. Specifically, the first output wheel 61 in the power output mechanism 6 is connected with the unidirectional transmission mechanism.

In some embodiments, as shown in FIG. 2 and FIG. 3, one side of the transmission connection device 13 is provided with a linear guide rail 4 parallel to the side. The linear guide rail 4 is in sliding connection with pedals 5. The pedals 5 are fixedly connected with the side of the transmission connection device 13. Specifically, the lengthwise direction of the linear guide rail 4 is linearly downward, and is preferably perpendicular to the vertical direction of a horizontal plane. Through such arrangement, linear downward pedaling is convenient, and labor is saved for riding. The pedals 5 are connected with a sliding block 51. The sliding block 51 is slidably fixed to the linear guide rail 4. One side of the sliding block 51 is provided with a fixing block 52. The fixing block 52 is fixed to the transmission connection device 13. In some embodiments, specifically, the transmission connection device 13 in the transmission module 1 is a chain; the linear guide rail 4 is parallel to one side of the chain; and the fixing block 52 is fixed to the side of the chain. Correspondingly, when the transmission connection device 13 is the chain, the first driven wheel 11 and the second driven wheel 12 are sprocket wheels. In some other embodiments, the transmission connection device 13 may further be a transmission belt. Correspondingly, when the transmission connection device 13 is the transmission belt, the first driven wheel 11 and the second driven wheel 12 are transmission wheels. In one aspect, the transmission connection device 13 of a belt structure can further reduce the weight of the transmission module. Specifically, the linear guide rail 4 is vertically disposed; the second driven wheel 12 is positioned above the first driven wheel 11; and tangent lines of the first driven wheel 11 and the second driven wheel 12 at a side close to the linear guide rail 4 are parallel to the linear guide rail 4. Through such arrangement, when the pedals 5 are stressed and pedaled, the pedals 5 can move downwards along the vertical linear guide rail 4. A chain segment of the chain at a side corresponding to the linear guide rail 4 is parallel and opposite to the linear guide rail 4, so that a spacing distance between the pedals 5 and the chain segment of the chain at a side corresponding to the linear guide rail 4 is constant when the pedals 5 move in the vertical direction. Meanwhile, the linear guide rail 4 is parallel to the chain segment of the chain at a side corresponding to the linear guide rail 4 in the vertical direction, so that the action force applied to the chain via the pedals 5 is fully acted on the vertical movement direction without generating horizontal component force.

When the pedals 5 are pedaled downwards, the first driven wheel 11 and the second driven wheel 12 rotate anticlockwise under the drive of the transmission connection device 13 and the second driven wheel 12 is fixed together with the shaft 121. Through the linkage effect, the unidirectional transmission mechanism fixedly connected with the shaft 121 of the second driven wheel 12 further rotates anticlockwise. Then, the unidirectional transmission mechanism drives the power output mechanism 6 connected with the unidirectional transmission mechanism to rotate anticlockwise, and the structure which is in transmission connection with the power output mechanism 6 obtains the forward power. Meanwhile, the connecting piece 2 which is in transmission engagement with the first transmission gear 111 further rotates clockwise by an angular displacement under the drive of the first transmission gear 111 which rotates anticlockwise, so that the elastic piece 3 obtains a tensile or compressive deformation, i.e., the resetting module has an elastic potential energy.

When the pedals 5 are released, the elastic piece 3 restores elastic deformation; the elastic potential energy is released to drive the connecting piece 2 to rotate anticlockwise and reset. The first transmission gear 111 which is in transmission connection with the connecting piece 2 further rotates clockwise. The first driven wheel 11 coaxially linked with the first transmission gear 111 further rotates clockwise, so as to drive the transmission connection device 13 to rotate clockwise. Thus, the transmission connection device 13 drives the second driven wheel 12 to rotate clockwise. Under the unidirectional transmission effect of the unidirectional transmission mechanism, only the second driven wheel 12 rotates clockwise, while the power output mechanism 6 connected to the unidirectional transmission mechanism does not rotate. After the elastic piece 3 releases the elastic potential energy, the transmission connection device 13 rotates clockwise and resets, and the pedals 5 connected to the transmission connection device 13 further reset to initial positions before pedaling. In some embodiments, specifically, the power output mechanism 6 may be a device having unidirectional transmission, such as a unidirectional bearing, a unidirectional clutch and the like. The embodiment of the present disclosure is described by selecting a unidirectional bearing with a brand of GMN and a model of FE 410Z2 as an example. The shaft 121 of the second driven wheel 12 is fixedly connected with an inner ring of the unidirectional bearing. The first output wheel 61 in the power output mechanism 6 is fixedly connected with an outer ring of the unidirectional bearing. When the shaft 121 of the second driven wheel 12 rotates anticlockwise, the inner ring and the outer ring of the unidirectional bearing are locked (in unidirectional transmission). At this moment, the inner ring and the outer ring cannot rotate relatively. The inner ring that rotates together with the shaft 121 of the second driven wheel 12 drives the outer ring to rotate anticlockwise. The first output wheel 61 fixedly connected with the outer ring further rotates synchronously and outputs a torque outward. When the shaft 121 of the second driven wheel 12 rotates clockwise, the inner ring of the unidirectional bearing can rotate relative to the outer ring. At this moment, the outer ring and the inner ring are not locked; the outer ring does not rotate with the inner ring, and the first output wheel 61 fixedly connected with the outer ring further does not rotate. At this moment, the power output mechanism 6 does not output the rotating torque.

Based on the transmission structure for the bicycle shown in FIG. 1, the present disclosure further proposes some other embodiments based on the transmission structure for the bicycle. Some embodiments of the present disclosure are described below in detail with reference to other drawings.

Figure 4:
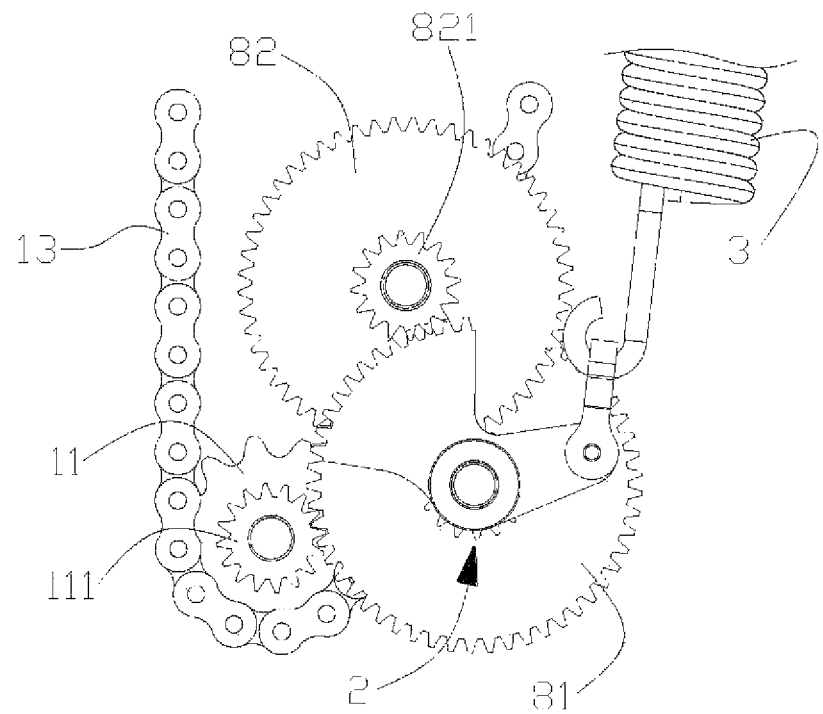
FIG. 4 is a structural diagram of transmission connection of a process amplification gear set, a connecting piece and a first transmission gear in an embodiment of the present disclosure.
Figure 5:
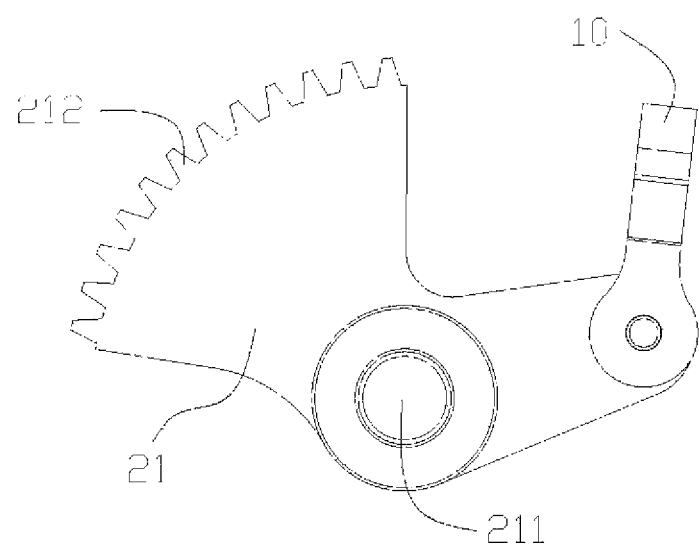
FIG. 5 is a structural diagram of a connecting piece in an embodiment of the present disclosure.

As shown in FIG. 4 and FIG. 5, in some embodiments, the connecting piece 2 is a gear engaging plate 21; the gear engaging plate 21 is rotatably connected through a rotating shaft 211 fixed to a bicycle frame; one end of the gear engaging plate 21 is provided with a transmission tooth 212 which is in transmission connection with the first transmission gear 111; and the other end of the gear engaging plate 21 is rotatably connected with the elastic piece 3. In some embodiments, this end of the gear engaging plate 21 is rotatably connected with a hanging portion 10. One end of the elastic piece 3 of the two transmission units 100 is connected with a fixing piece, and the other end is hung with the hanging portion 10.

Figure 10:
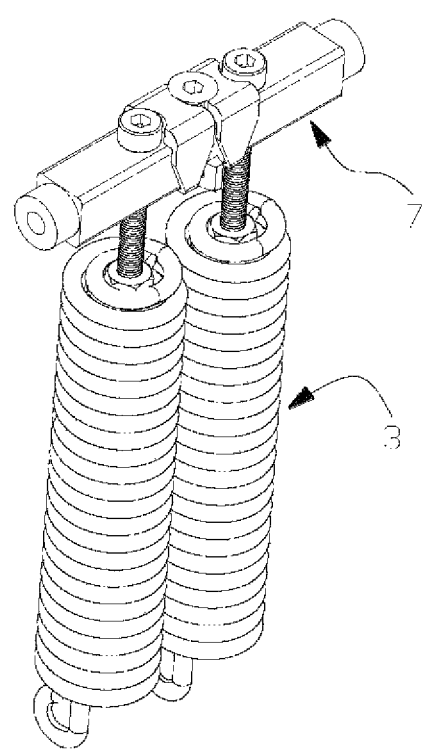
FIG. 10 is a three-dimensional structural diagram that two elastic pieces are connected with an adjustable fixing piece in an embodiment of the present disclosure.
Figure 11:
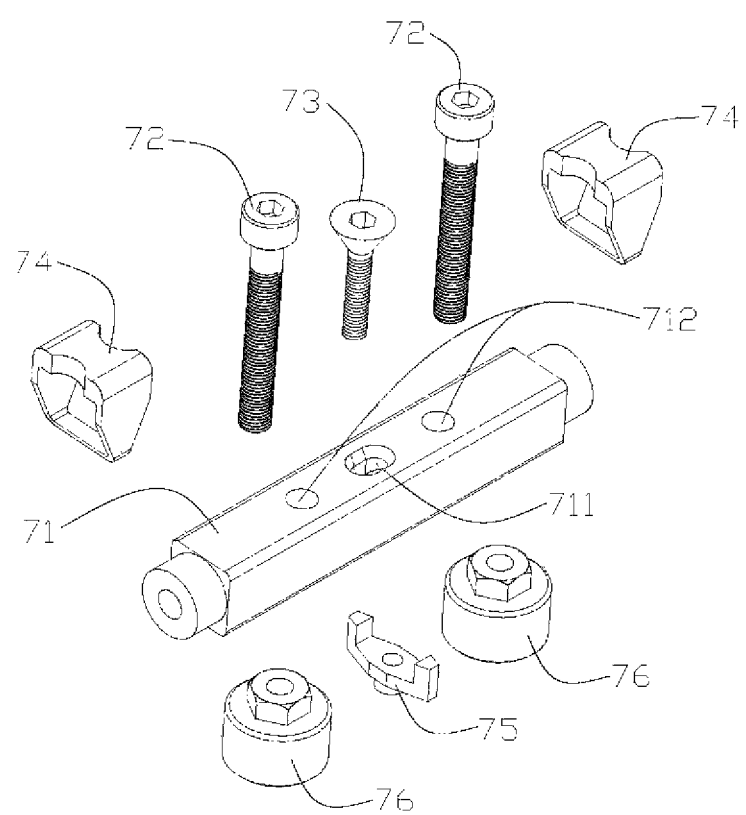
FIG. 11 is an exploded structural diagram of an adjustable fixing piece in an embodiment of the present disclosure.

Further, in some embodiments, as shown in FIG. 10 and FIG. 11, the fixing piece is an adjustable fixing piece 7. One end of the elastic piece 3 is hung to the hanging portion 10, and the other end is hung to the adjustable fixing piece 7 in an adjustable mode. The adjustable fixing piece 7 includes a fixing seat 71, a tapered screw 73, a fixing head 76, a locking head 75, two adjusting threaded rods 72 and two sliding pieces 74. The fixing seat 71 is provided with two adjusting threaded rod holes 712 used to penetrate the two adjusting threaded rods 72 through threads and a screw hole 711 used to penetrate the tapered screw 73 through threads. As shown in FIG. 10, the two sliding pieces 74 are respectively sleeved on the fixing seat 71 in a sliding way, and are positioned between the corresponding adjusting threaded rod hole 712 and the screw hole 711. The two corresponding adjusting threaded rods 72 are clamped and fixed through the corresponding two sliding pieces 74. The fixing head 76 is in threaded connection with lower ends of the adjusting threaded rods 72 and is fixedly connected with the other end of the elastic piece 3. The locking head 75 is in threaded connection with a lower end of the tapered screw 73. A distance between the heads of the adjusting threaded rods 72 and the fixing head 76 can be adjusted through the adjusting threaded rods 72. Namely, the adjusting threaded rods 72 are screwed to screw rod bodies into the fixing head 76, thereby adjusting the distance between the upper end of the elastic piece 3 and the fixing seat 71 so as to adjust predetermined deformation of the elastic piece 3. When the adjusting threaded rods 72 need to be adjusted, a tapered head of the tapered screw 73 forces the sliding piece 74 to extrude the heads of the adjusting threaded rods 72 by means of up and down motion of the tapered screw 73, so that the adjusting threaded rods 72 connected with the elastic piece 3 are clamped and locked. The elastic piece 3 can be better protected through the adjustable fixing piece 7 to prolong the service life of the elastic piece 3.

Further, in some embodiments, as shown in FIG. 3, a process amplification gear set 8 is disposed between the connecting piece 2 and the first transmission gear 111. Specifically, as shown in FIG. 4, the process amplification gear set 8 includes a first amplification gear 81 and a second amplification gear 82. A first engaging gear is coaxially fixed to the first amplification gear 81, and a second engaging gear 821 is coaxially fixed to the second amplification gear 82. The first amplification gear 81 is engaged with the first transmission gear 111, and the second amplification gear 82 is engaged with the first engaging gear. The second engaging gear 821 is engaged with the connecting piece 2. Diameters of the first amplification gear 81 and the second amplification gear 82 are greater than those of the first engaging gear, the second engaging gear 821 and the first transmission gear 111. The process amplification is realized through large and small gears. The elastic piece 3 only needs small elastic deformation to reset the pedals 5, thereby prolonging the service life of the elastic piece 3.

Figure 6:
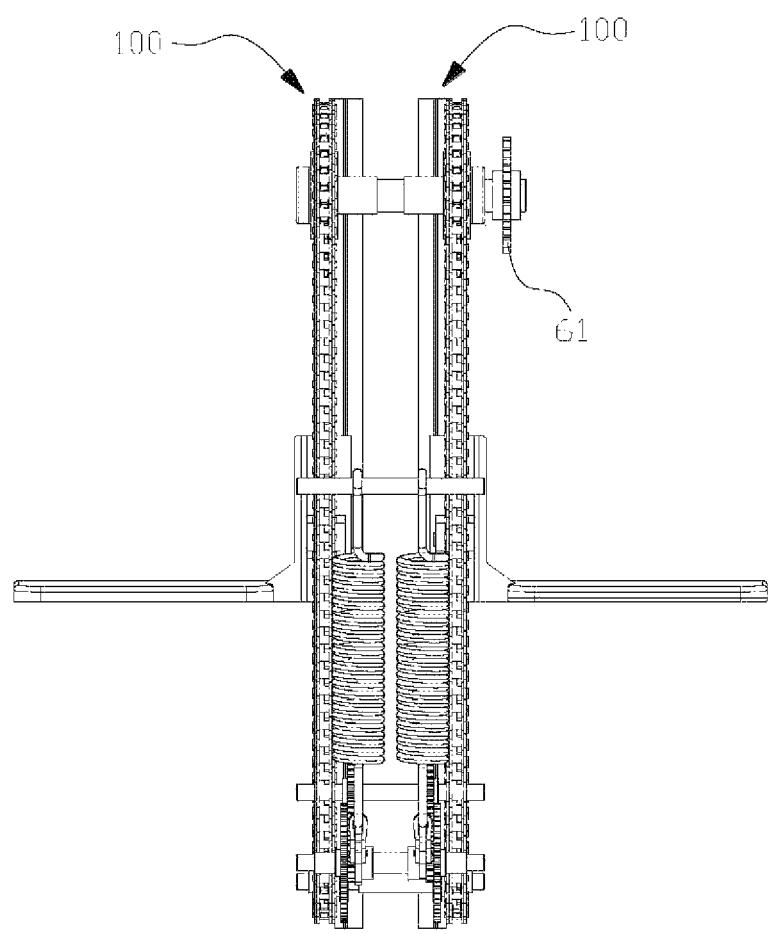
FIG. 6 is a structural diagram when a power output mechanism is positioned outside a transmission unit in an embodiment of the present disclosure.
Figure 7:
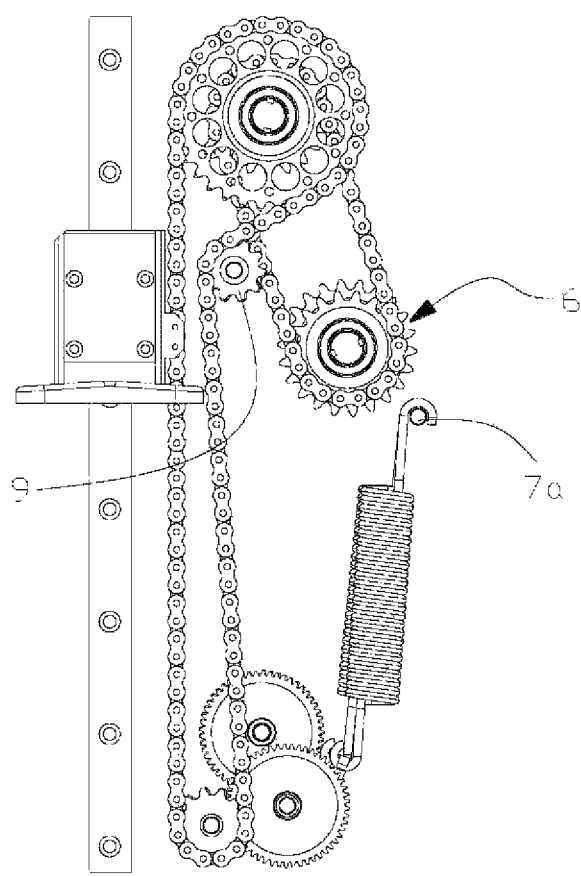
FIG. 7 is a structural diagram that a transmission connection device is provided with an auxiliary wheel rotatably connected therewith in an embodiment of the present disclosure.
Figure 8:
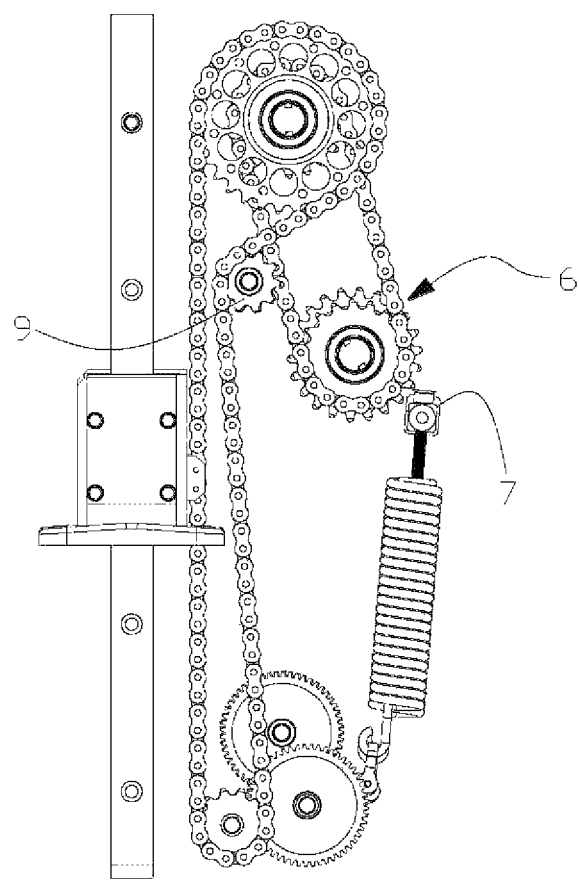
FIG. 8 is a structural diagram that an adjustable fixing piece is fixed to an upper end of an elastic piece in an embodiment of the present disclosure.
Figure 9:
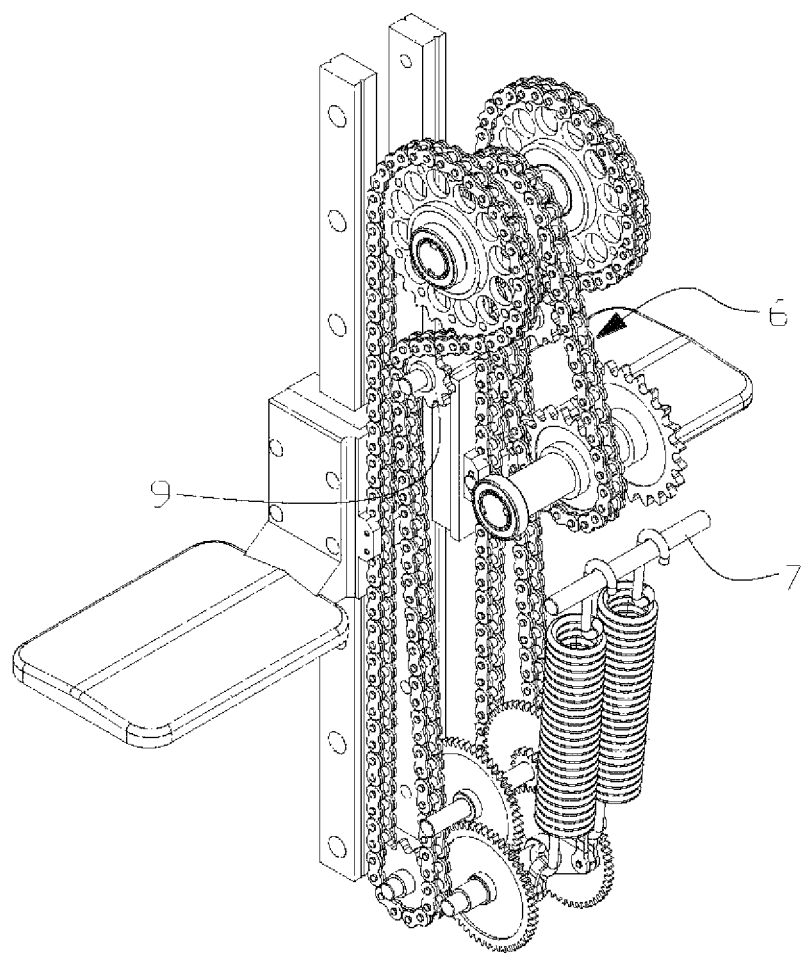
FIG. 9 is a three-dimensional structural diagram that a fixing piece is an adjustable fixing piece in an embodiment of the present disclosure.

In some embodiments, as shown in FIG. 6, the power output mechanism 6 is disposed at an outer end of the shaft 121, i.e., on an outer side of one of two second driven wheels 12. As shown in FIG. 7, FIG. 8 and FIG. 9, the transmission connection device 13 is rotatably connected with an auxiliary wheel 9. The auxiliary wheel 9 adjusts the position of the transmission connection device 13 and arranges the transmission connection device 13 more tidily, so as to reduce occupied space and avoid interference with other components. When the transmission connection device 13 is a chain, accordingly, the auxiliary wheel 9 is a sprocket wheel; and when the transmission connection device 13 is a belt, accordingly, the auxiliary wheel 9 is a belt.

In some embodiments, as shown in FIG. 1 to FIG. 3, FIG. 6 and FIG. 7, the fixing piece connected to the other end of the elastic piece 3 may further be a fixing rod 7a. The fixing rod 7a is fixed and unadjustable. As shown in FIG. 8 and FIG. 9, an embodiment of the present disclosure is shown. The elastic piece 3 is provided with the adjustable fixing piece 7 and the process amplification gear set 8. By means of dual adjustment protections, the service life of the elastic piece 3 can be better prolonged. In some embodiments, the elastic piece 3 may be selected from one of a tension spring, a pressure spring, a coil spring, a spring and a torsional spring.

Figure 12:
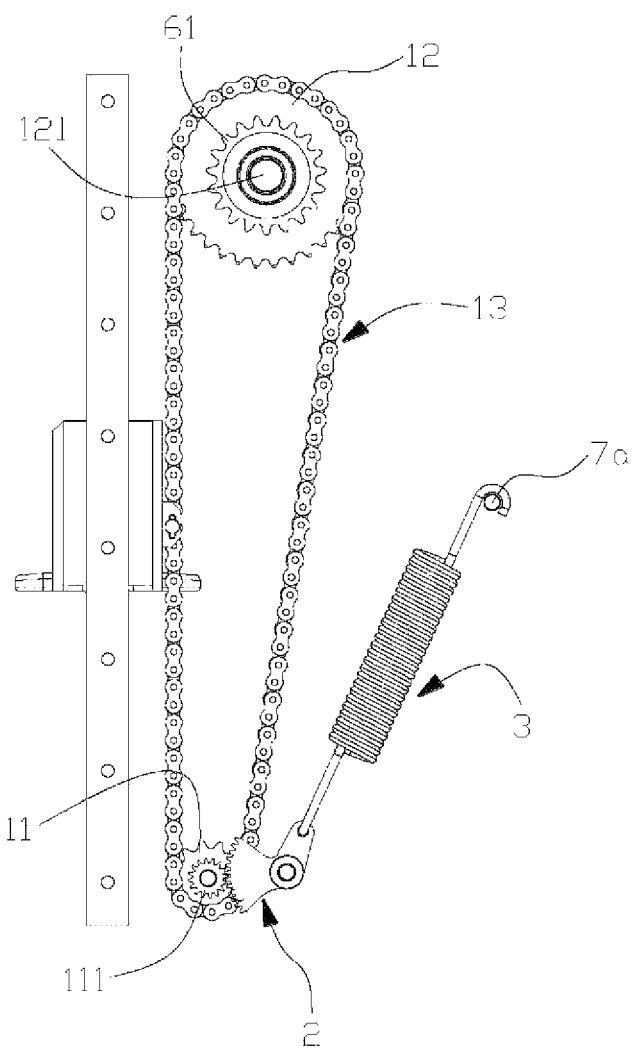
FIG. 12 is a structural diagram of a side surface of a transmission unit when a connecting piece is directly engaged with a first transmission gear in an embodiment of the present disclosure.

In some embodiments, as shown in FIG. 12, FIG. 12 shows a structural diagram of a side surface of a transmission unit 100 when a connecting piece 2 is directly engaged with a first transmission gear 111. In the specific embodiment, the connecting piece 2 of the transmission unit 100 is directly engaged with the first transmission gear 111, and the process amplification gear set 8 is not disposed in the middle. The other end of the gear engaging plate 21 is rotatably connected with the elastic piece 3 directly, i.e., one end of the elastic piece 3 is directly hung to a hanging hole at this end of the gear engaging plate 21.

The above shows and describes the basic principle, main features and advantages of the present disclosure. Those skilled in the art shall understand that the present disclosure is not limited by the above embodiments. The above embodiments and the description only describe the principle of the present disclosure. Various changes and improvements can further be made to the present disclosure without departing from the spirit and the scope of the present disclosure. These changes and improvements are included in the claimed scope of the present disclosure. The protection scope claimed in the present disclosure is defined by the appended claims and equivalents thereof.

I claim:

1. A transmission structure for a bicycle, comprising two opposite transmission units, wherein each of the transmission units comprises a linear reciprocating pedaling mechanism and a transmission module which is in transmission connection with the linear reciprocating pedaling mechanism; and the transmission modules of the two transmission units are connected with a power output mechanism through a unidirectional transmission mechanism, each of the transmission units further comprises a resetting module connected with the transmission module; the transmission module comprises a first driven wheel and a first transmission gear configured to be coaxial with the first driven wheel; the resetting module comprises a connecting piece and an elastic piece; the connecting piece is connected with the first transmission gear, and the elastic piece is connected with the connecting piece; wherein the transmission module further comprises a second driven wheel and a transmission connection device; and the first driven wheel is connected with the second driven wheel through the transmission connection device; and the linear reciprocating pedaling mechanism comprises a linear guide rail which is disposed linearly and a pedal which is in sliding connection with the linear guide rail; the linear guide rail is parallel to one side of the transmission connection device; and the pedal is fixedly connected with the side of the transmission connection device.

2. The transmission structure according to claim 1, wherein the transmission connection device is provided with an auxiliary wheel rotatably connected therewith.

3. The transmission structure according to claim 1, wherein the connecting piece is a gear engaging plate; the gear engaging plate is rotatably connected through a rotating shaft fixed to a bicycle frame; one end of the gear engaging plate is provided with a transmission tooth which is in transmission connection with the first transmission gear, and the other end of the gear engaging plate is provided with a hanging portion rotatably connected therewith.

4. The transmission structure according to claim 1, wherein the other end of the elastic piece of each of the two transmission units is connected with a fixing piece.

5. The transmission structure according to claim 4, wherein the fixing piece is an adjustable fixing piece and comprises a fixing seat, a tapered screw, a fixing head, a locking head, two adjusting threaded rods and two sliding pieces; the fixing seat is provided with two adjusting threaded rod holes used to penetrate the two adjusting threaded rods through threads and a screw hole used to penetrate the tapered screw through threads; the two sliding pieces are respectively sleeved on the fixing seat in a sliding way, and are positioned between the corresponding adjusting threaded rod hole and the screw hole; the fixing head is in threaded connection with lower ends of the adjusting threaded rods and is fixedly connected with the other end of the elastic piece; and the locking head is in threaded connection with a lower end of the tapered screw.

6. The transmission structure according to claim 5, wherein a process amplification gear set is disposed between the connecting piece and the first transmission gear.

7. The transmission structure according to claim 1, wherein the elastic piece is selected from one of a tension spring, a pressure spring, a coil spring, a spring and a torsional spring.

* * * * *